US 9,628,266 B2

United States Patent
Rohloff et al.

(10) Patent No.: US 9,628,266 B2
(45) Date of Patent: Apr. 18, 2017

(54) SYSTEM AND METHOD FOR ENCODING ENCRYPTED DATA FOR FURTHER PROCESSING

(71) Applicant: RAYTHEON BBN TECHNOLOGIES CORP., Cambridge, MA (US)

(72) Inventors: Kurt Ryan Rohloff, South Hadley, MA (US); David Bruce Cousins, Barrington, RI (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 525 days.

(21) Appl. No.: 14/191,021

(22) Filed: Feb. 26, 2014

(65) Prior Publication Data
US 2017/0078086 A1  Mar. 16, 2017

(51) Int. Cl.
H04K 1/00 (2006.01)
H04L 9/00 (2006.01)
H04L 9/28 (2006.01)
H04L 9/06 (2006.01)

(52) U.S. Cl.
CPC .................... H04L 9/06 (2013.01)

(58) Field of Classification Search
CPC . H04L 9/008; H04L 63/0471; H04L 63/0428; H04L 63/0442; H04L 63/061; H04L 9/3093; H04L 65/403; H04K 1/00
See application file for complete search history.

(56) References Cited

U.S. PATENT DOCUMENTS 6,324,505 B1 *  11/2001  Choy ............... G10L 19/0204
                                                     704/201
2004/0017851 A1 *  1/2004  Haskell ............... H04N 19/52
                                                     375/240.16
(Continued)

OTHER PUBLICATIONS

Real-time Adaptive Concepts in Acoustics, Blind Signal Separation and Multichannel Echo Cancellation, Daniel W.E. Schobben, 2001.*

(Continued)

*Primary Examiner* — Michael S McNally
*Assistant Examiner* — Amie C Lin
(74) *Attorney, Agent, or Firm* — Lewis Roca Rothgerber Christie LLP (57) ABSTRACT

A method for encoding encrypted data for further processing includes: receiving an input data vector of length m; splitting the input data vector to k multiple vectors; multiplying each of the multiple vectors by a power of 2 to obtain k number of intermediate vectors; summing the k number of intermediate vectors to obtain a single summed vector; encrypting the single summed vector to obtain an encrypted vector; sending the encrypted vector to an operational unit to have the encrypted vector operated on to obtain a processed encrypted vector; receiving the processed encrypted vector; decrypting the received encrypted vector; dividing the processed decrypted vector by a power of 2, modulus a power of 2 to obtain multiple transitional vectors of the same dynamic range and the same length; and concatenating the multiple transitional vectors to obtain a recovered vector of length m.

11 Claims, 6 Drawing Sheets

(56) References Cited

U.S. PATENT DOCUMENTS

2006/0198520 A1* 9/2006 Courtney .............. H04L 1/0056
380/247
2012/0020418 A1* 1/2012 Sands ...................... H04B 3/32
375/259

OTHER PUBLICATIONS

Phase Vocoder Design, Implementation, and Effects Processing, Matthew Pierce, Aug. 4, 2009.*

* cited by examiner

SYSTEM AND METHOD FOR ENCODING ENCRYPTED DATA FOR FURTHER PROCESSING

STATEMENT REGARDING FEDERALLY SPONSORED RESEARCH

This invention disclosure is related to a government contract number FA8750-11-C-0098. The U.S. Government has certain rights to this invention.

FIELD OF THE INVENTION

The present invention relates to data privacy and encryption and more specifically to a system and method for encoding encrypted data for further optimal processing.

BACKGROUND

A typical system for enabling multiple entities to exchanging data or communicate with one another may include a form of a distributed communication system, in which multiple parties to a communication are connected to each other through a network and a central hub or switch. In many circumstances, where that data being exchanged includes sensitive information, it is important to maintain privacy from external security threats. Additionally, in some circumstances, the network itself may not be reliably secure or trustworthy. For example, various parties engaging in a teleconference may be speaking about sensitive information from various trusted locations throughout the world, but the telecommunication system or the central data mixer used to transmit data between the parties may not be secure or trustworthy.

A vocoder or voice encoder is a device that reproduces speech/voice. A vocoder may include both an encoder for encoding the voice data and a decoder for decoding the encoded voice data. In the encoder, the input is passed through a multiband filter, each band is passed through an envelope follower, and the control signals from the envelope followers are communicated to the decoder. The decoder applies these (amplitude) control signals to corresponding filters in the synthesizer. By encrypting the control signals, voice transmission can be secured against interception.

However, conventional vocoders have not been all of linear, computationally efficient and compatible with additive homomorphic encryption schemes to enabled encrypted VoIP teleconferencing capabilities.

SUMMARY OF THE INVENTION

In some embodiments, the present invention is a computer implemented method for encoding encrypted data for further processing. The method includes: receiving an input data vector of length m, where m is an integer; splitting the input data vector to k multiple vectors, each multiple vector having a length smaller than m, where k is an integer; multiplying each of the multiple vectors by a power of 2 to obtain k number of intermediate vectors, each intermediate vector having a same length equal to the length of a vector of the k multiple vectors with the largest length; summing the k number of intermediate vectors to obtain a single summed vector; encrypting the single summed vector to obtain an encrypted vector; sending the encrypted vector to an operational unit to have the encrypted vector operated on to obtain a processed encrypted vector; receiving the processed encrypted vector; decrypting the received encrypted vector; dividing the processed decrypted vector by a power of 2, modulus a power of 2 to obtain multiple transitional vectors of the same dynamic range and the same length; and concatenating the multiple transitional vectors to obtain a recovered vector of length m.

In some embodiments, the present invention is a voice data terminal for encoding encrypted data for further processing. The voice terminal includes a first input port for receiving an input data vector of length m, where m is an integer; a splitter circuit for splitting the input data vector to k multiple vectors, each multiple vector having a length smaller than m, where k is an integer; a multiplier for multiplying each of the multiple vectors by a power of 2 to obtain k number of intermediate vectors, each intermediate vector having a same length equal to the length of a vector of the k multiple vectors with the largest length; an adder for summing the k number of intermediate vectors to obtain a single summed vector; an encryption circuit for encrypting the single summed vector to obtain an encrypted vector; an output port for sending the encrypted vector to an operational unit to have the encrypted vector operated on to obtain a processed encrypted vector; a second input port for receiving the processed encrypted vector; a decryption circuit for decrypting the received encrypted vector; a divider for dividing the processed decrypted vector by a power of 2, modulus a power of 2 to obtain multiple transitional vectors of the same dynamic range and the same length; and an inserter for concatenating the multiple transitional vectors to obtain a recovered vector of length m.

In some embodiments, the received input data vector may be down-sampled, before splitting. In some embodiments, the recovered output data vector may be up-sampled, after concatenating.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

In some embodiments, the present invention is directed to a system (e.g., a vocoder) and method for taking voice samples from a client terminal and encoding the voice samples as vectors of integers. The vocoder is linear so that it can be used, for example, with an additive homomorphic encryption scheme to provide an encrypted teleconferencing capability.

In some embodiments, the present invention is a system and method for parties (e.g., several client terminals) to a distributed communication session (using communication terminals) to have privacy-preserving communications, where communication privacy is maintained. Examples of distributed communication system includes Voice over IP (VoIP) teleconferencing systems, video conferencing systems, control systems, detection systems, accounting systems, and the like.

In some embodiments, the encoded voice samples are encrypted using the additive homomorphic encryption scheme. These operations are performed on multiple client terminals. The resulting ciphertexts are sent to a mixer which queues and adds the ciphertexts from the client terminals. The resulting added ciphertext can be sent back to the client terminals. When decrypted with the additive homomorphic decryption scheme, decoded using the decoding scheme of the present invention, and played back to the client terminals, the resulting audio is a mixing of the audio from the client terminals.

The present approach is compatible with a variety of distributed communication schemes, such as encrypted VoIP teleconferencing using additive homomorphic encryption and ring switching.

Figure 1:
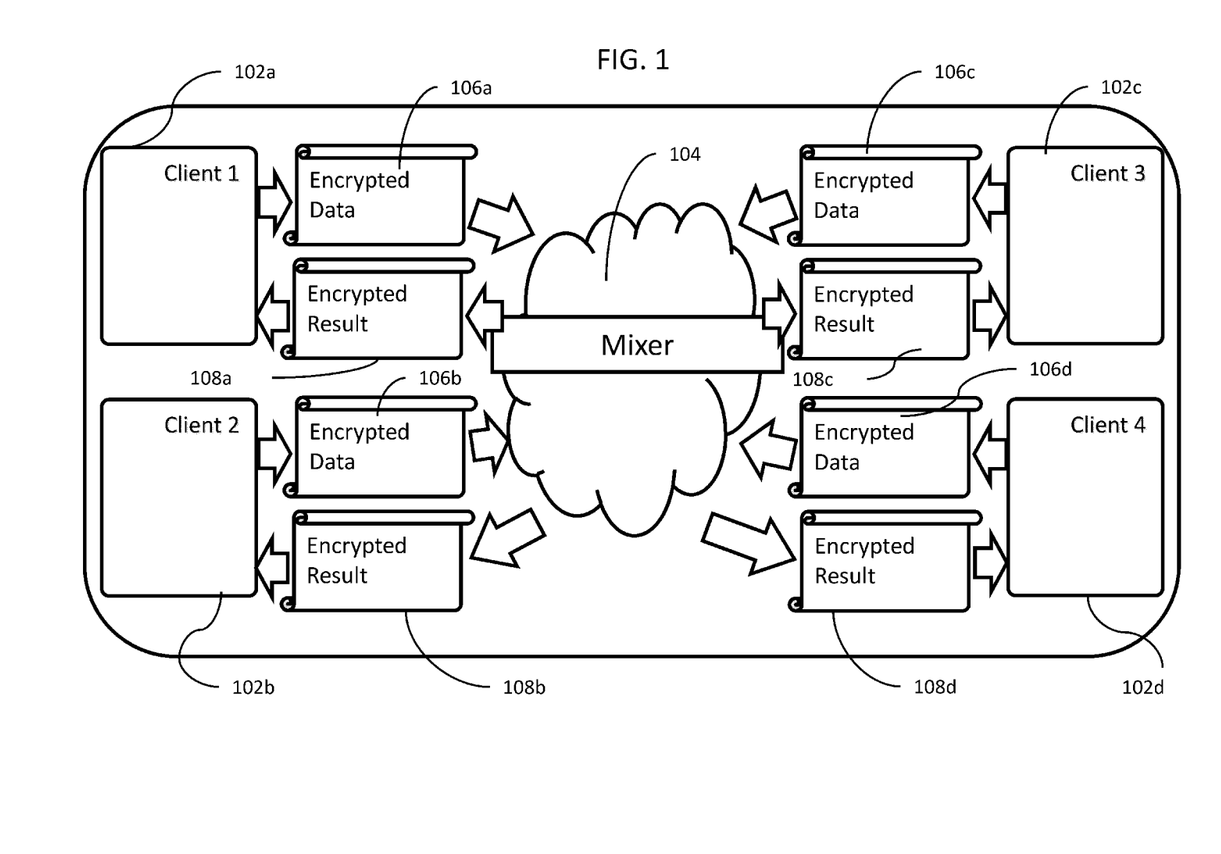
FIG. 1 shows an exemplary block diagram for a distributed communication system, according to some embodiments of the present invention.

FIG. 1 shows an exemplary block diagram for a distributed communication system, according to some embodiments of the present invention. Each of the clients 102a, 102b, 102c and 102d samples voice data (in the case of voice), encodes it, encrypts it and sends the encrypted data 106a, 106b, 106c or 106d to a mixer 104. The mixer 104 operates on the encrypted data and sends the results 108a, 108b, 108c and 108d back to the respective client terminals, which are then decrypted, decoded and played back (in the case of voice) to the respective clients.

Any encryption system may be used with the system and method of the present invention that supports an additive homomorphism, key switching and representation switching to a common which could be implemented in a practical manner. A representational scheme is NTRU which can be made both Somewhat Homomorphic (SHE) and Fully Homomorphic (FHE). For the representational NTRU scheme, all ciphertexts are able to be represented as integer vectors which are ring elements where the length of the vectors is the ring dimension.

In some embodiments, for example, in the case of voice communication, for the situation where a client would not want to receive its own voice data from the mixer, the encrypted results from the mixer may be in a matrix representation, where the data in each column is the encrypted result for each client terminal. This added column may be set to 0, if the corresponding recipient of the column is not intended to receive the voice data being added and all other columns would be the data being added. Redundant column data need not be carried through the process.

Figure 2:
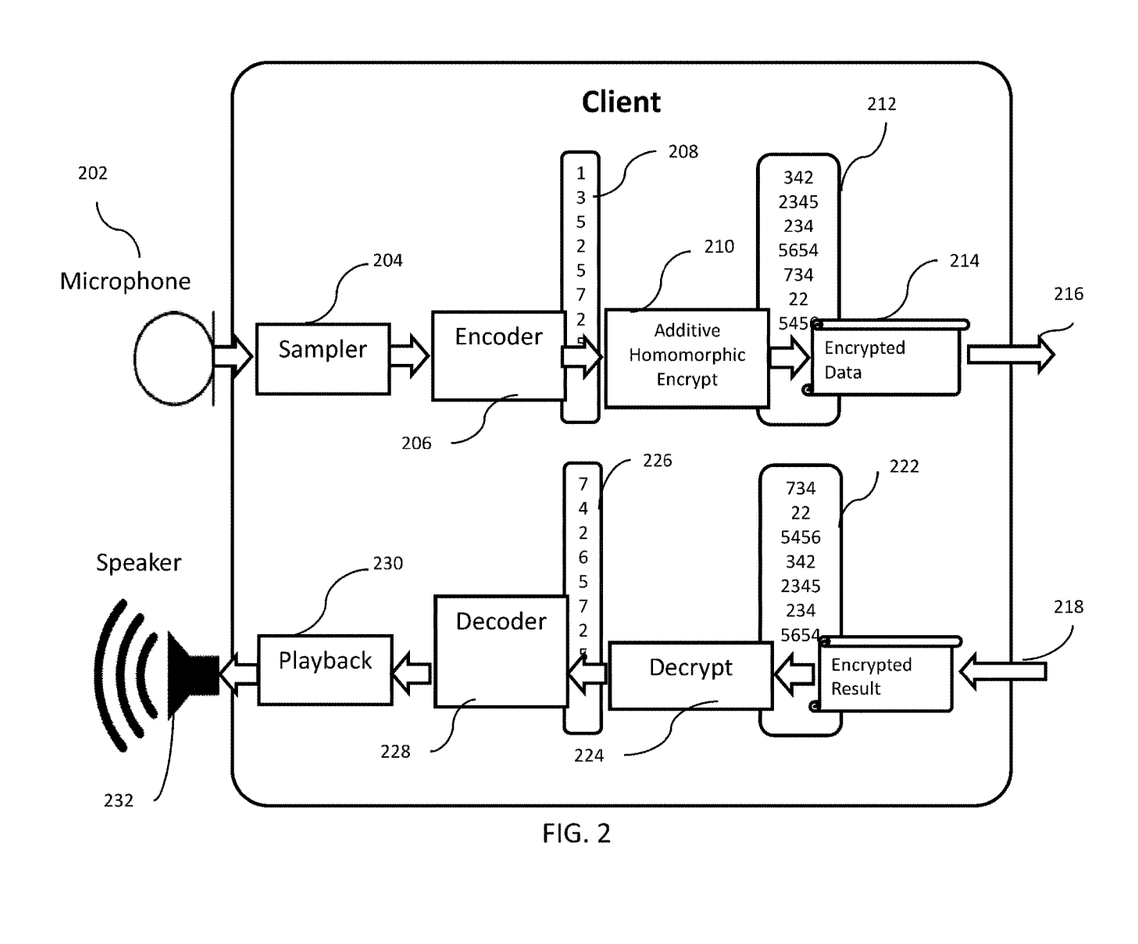
FIG. 2 shows data encryption and decryption by a client terminal, according to some embodiments of the present invention.

FIG. 2 shows data encryption and decryption by a client terminal, according to some embodiments of the present invention. The example illustrated by FIG. 2 relates to voice conferencing and includes a microphone 202 to capture the voice, a sampler 204 to sample the analog voice signals, and a playback 230 to play back the voice via a speaker 232. However, in case of general data communication without voice, microphone 202, sampler 204, playback 230 and speaker 232 may not be needed. As shown, a client terminal receives the voice data from a microphone 202, samples the voice data using the sampler 204 and feeds the sampled data to an (linear) encoder 206, which encodes the data and generates a data vector 208. The data vector 208 is then encrypted with client's private key by an additive homomorphic encryption module 210, using an additive homomorphic encryption scheme.

The encrypted data is represented by vector 212, which is then sent (216) to a mixer to be operated on. However, the data received from each client may have different bandwidth and/or frame size. When data with different bandwidth and/or frame size is encrypted, each encrypted data set would have a different ring size. Moreover, clients may be using different encryption and/or encoding schemes, which could produce vectors 212 of different length or rate. For the mixer to perform any mixing, encoding and/or other operations, on the combination of the vectors 212 from the plurality of client terminals, the vectors 212 from the clients would have to have a common ring size that can be shared.

After the mixing and/or other operations are performed, the encrypted result 218 is received from the mixer, for example, in the form of a vector 222. The result 218 is decrypted by a decryption module 224 to generate a vector 226 of decrypted data to be decoded by the decoder 628. In case of voice data, the decrypted data is played back (230) over a speaker 232. In the case of non-voice data communication, the decoded data is send to a desired destination, without any play back.

In some embodiments, an NTRU algorithm is used as a representational additive homomorphic encryption scheme which provides encryption and decryption functions. The NTRU encryption algorithm is lattice based, and its security is based on the shortest vector problem. Operations are based on objects in a truncated polynomial ring with convolution multiplication, where all polynomials in the ring have integer coefficients.

In some embodiments, the linear encoder 206 uses a variable encoding scheme to operate in different rings. Such an approach uses a control scheme analogous to transmission control protocol (TCP) to continually monitor, estimate and select bandwidth usage to maximize throughput.

Figure 3A:
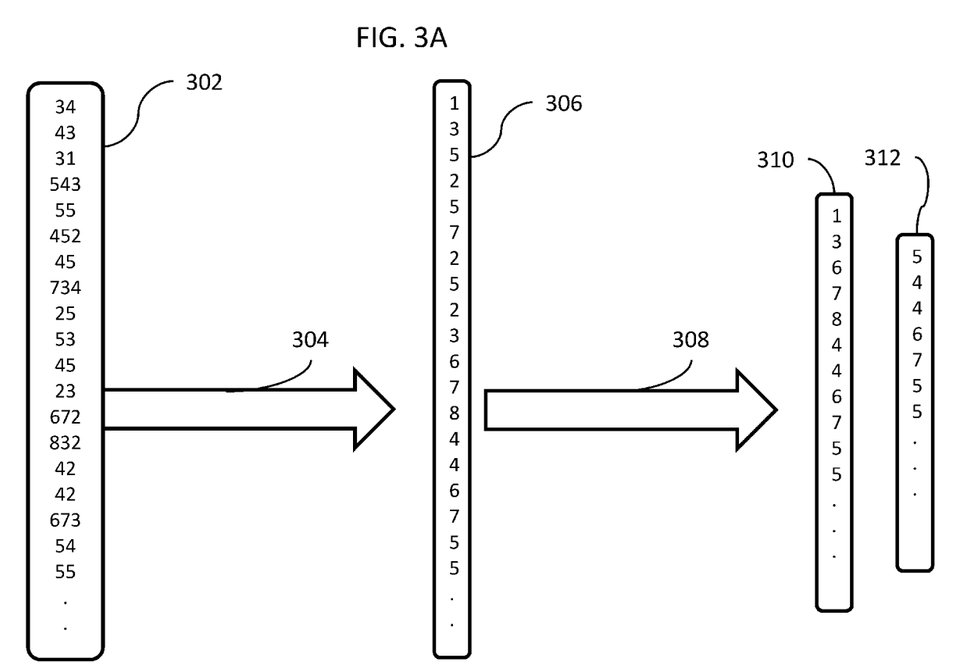
FIGS. 3A and B are exemplary diagrams depicting an encoding scheme, according to some embodiments of the present invention.
Figure 3B:
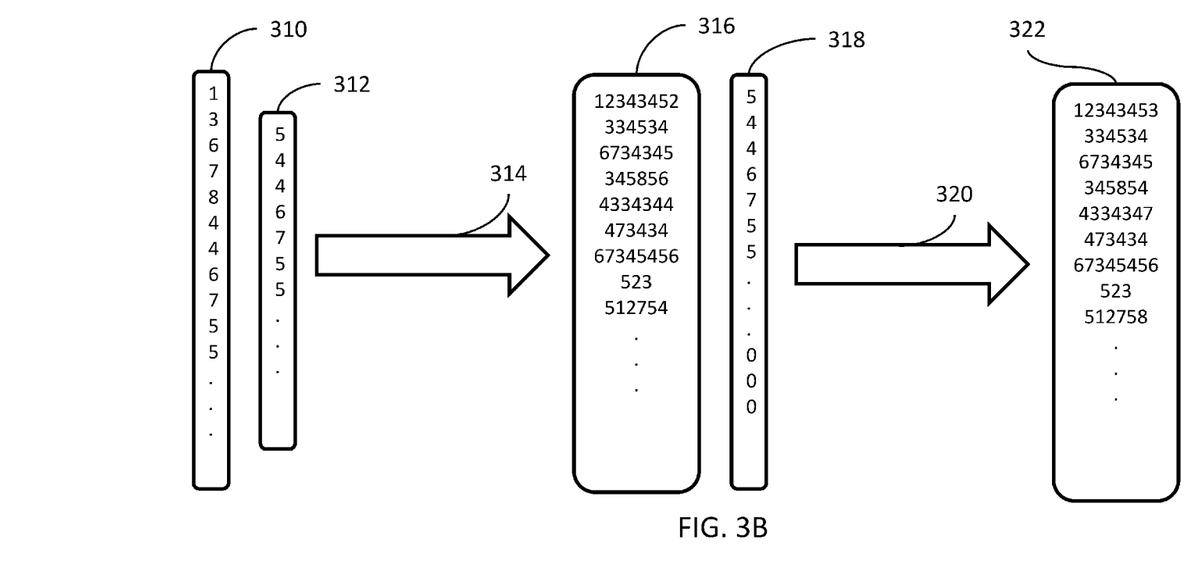

FIGS. 3A and B are exemplary diagrams depicting an encoding scheme, according to some embodiments of the present invention. As shown in FIG. 3A, a vector of m x-bit samples 302 is input to the encoder of a vocoder. This vector 302 is down-sampled (304) to covert the original samples of x-bit wide to samples of y-bit wide, while keeping the most significant bits. The resulting vector is denoted by 306 in FIG. 3A. If the samples are not zero-centered, they can be shifted by their offset so they are centered around 0, mod $2^y$. This is because when the samples are centered around 0, mod $2^y$, an arbitrary number of samples can be added together and the result will still be centered around 0, mod $2^y$, avoiding any complications associated with tracking the sampling center that would need to be tracked during decoding.

The down sampled vector 306 is then split (308) into, for example, an $n=2^{\wedge}$ (floor (log 2(m/(k-1)))) length vector 310 and a ((k-1)*m-n) length vector 312. The samples of both of the two vectors 310 and 312 remain to be y-bit samples. This splitting obtains the longest sub-vector of the down sampled vector whose length is the power of 2 input length used by the encryption scheme. The representative encryption scheme of the present invention takes input plaintext whose length is a power of 2 and therefore the splittings of the input vector is determined in such a way to fit the power-of-2 length. The equation $n=2^{\wedge}$ (floor (log 2(m/(k-1)))) returns the longest such power of 2. It may not be possible to split the input vector so that all outputs are a power-of-2 length, consequently, a reminder length which is ((k-1)*m-n) entries may be left. Although, for simplicity reasons, the example of FIG. 3A splits the vector 306 being split into two vectors, this vector may be split into k vectors, where k is an integer greater than 2. In some embodiments, the splitting may be performed by a splitter circuit known in the art. Further, although the vector is shown as being split into k contiguous blocks, other splittings of the length m vector into k sub-vectors is possible, as long as that splitting can be reversed during the decoding process.

As depicted in FIG. 3B, the n y-bit sample vector 310 is then multiplied (314) by $2^{(y+z)}$ to generate a vector 316 of n samples. In a binary representation, this multiplication shifts the vector entries to the left by padding zeroes to the right hand side of every entry representation. Therefore, this vector can be added to the (m−n) y-bit sample in a way that the original bit representations of the input vectors can be recovered by simple inspection of the binary representation of the summed vector. In some embodiments, the multiplication may be performed by a multiplier circuit known in the art. In some embodiments, the multiplication is performed by shifting the n y-bit samples of vector 310 by z to the left. For the generalization of k−1 vectors of length n, the ith vector out of the $\{1, \ldots, k-1\}$ vectors is multiplied by $2^{(y+i*z)}$.

Additionally, the (m−n) sample vector 312 is padded with (2n−m) 0's to generate another vector 318 of n samples long, but none of the original entries in this vector are modified. Subsequently, the two generated vectors 316 and 318 are summed (320) together. This result is an encoded vector 322. In embodiments with more than 2 vectors, all of the vectors are added. In their binary representations, because the multiplication shifts the vector entries to the left by padding zeroes to the right hand side of every entry representation, even after the vectors are added, the original bit representations of the input vectors can be recovered by simple inspection of the binary representation of the summed vector. This encoded vector may then be encrypted and sent to a mixer to have it mixed with other encrypted voice data.

Figure 4:
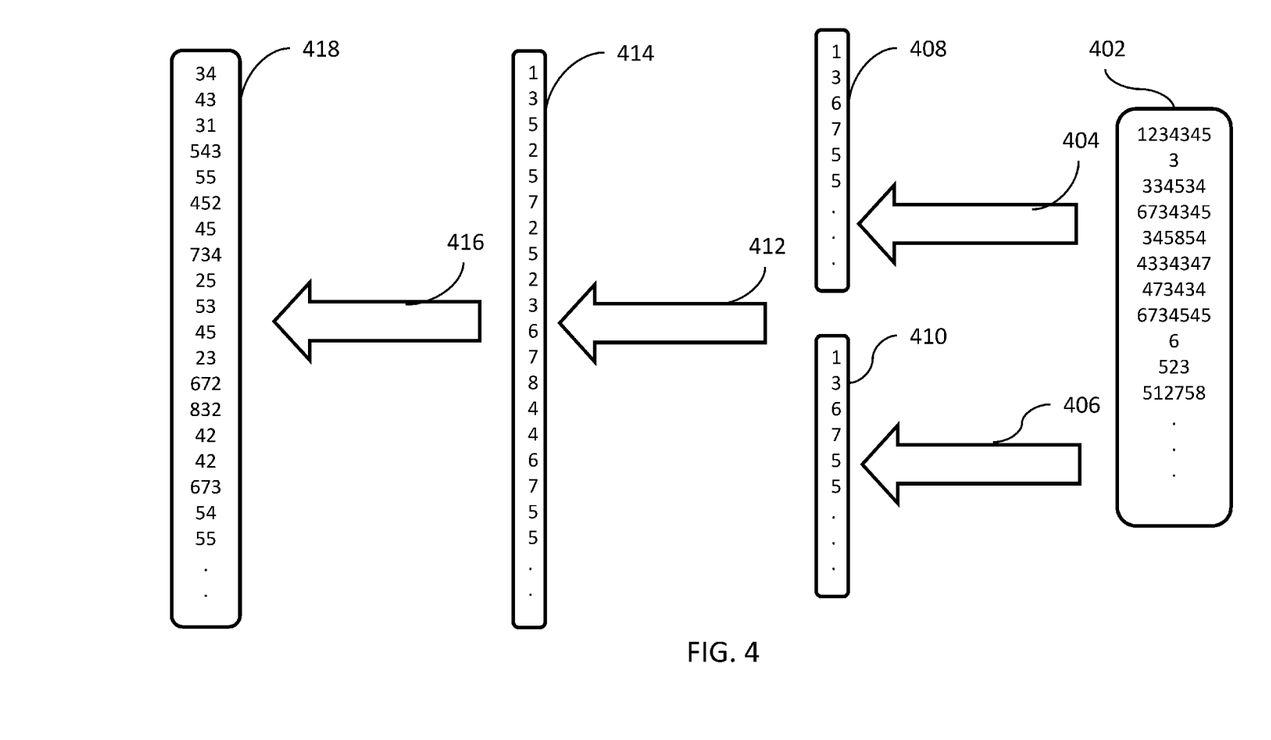
FIG. 4 is an exemplary diagram showing a decoding scheme, according to some embodiments of the present invention.

FIG. 4 is an exemplary diagram showing a decoding scheme, according to some embodiments of the present invention. As shown, an input vector 402 is received at the input of the decoder, for example, from a mixer. This vector 402 has n samples, each sample is (y+k*z)-bit wide. An integer division by $2^{(y+z)}$ is performed on the input vector 412 to obtain a vector 408, which represents the most significant bits (MSB) of the input vector 402. In some embodiments, the dividing may be performed by a divider circuit known in the art. Furthermore, a mod $2^{(y+z)}$ (406) is performed on the input vector 402 to obtain vector 410. Vector 410 represents the least significant bits (LSB) of the input vector 402. These vector 408 and 410 are of the same length each representing portions of the input vector 402.)

For the generalization when k>2, one would perform integer division by $2^{(y+i*z)}$ and a mod $2^{(y+(i+1)*z)}$ for i between 1 and k−1 to obtain the k−1 vectors encoded as the MSB bits.

The two resulting vectors 408 and 410 are then concatenated (412) to obtain a single vector 414 of the original m with y+2 bit samples. This bit vector is the summation of all of the down-sampled input vectors from all clients. Vector 414 is then scaled (416) by $2^{(x-y-z)}$ to get a resulting decoded output vector 418 to be played back to the client terminal. In some embodiments, the concatenation may be performed by an inserter circuit known in the art, which inserts the bits from the multiple vectors into the respective places in the single vector 414.

Figure 5:
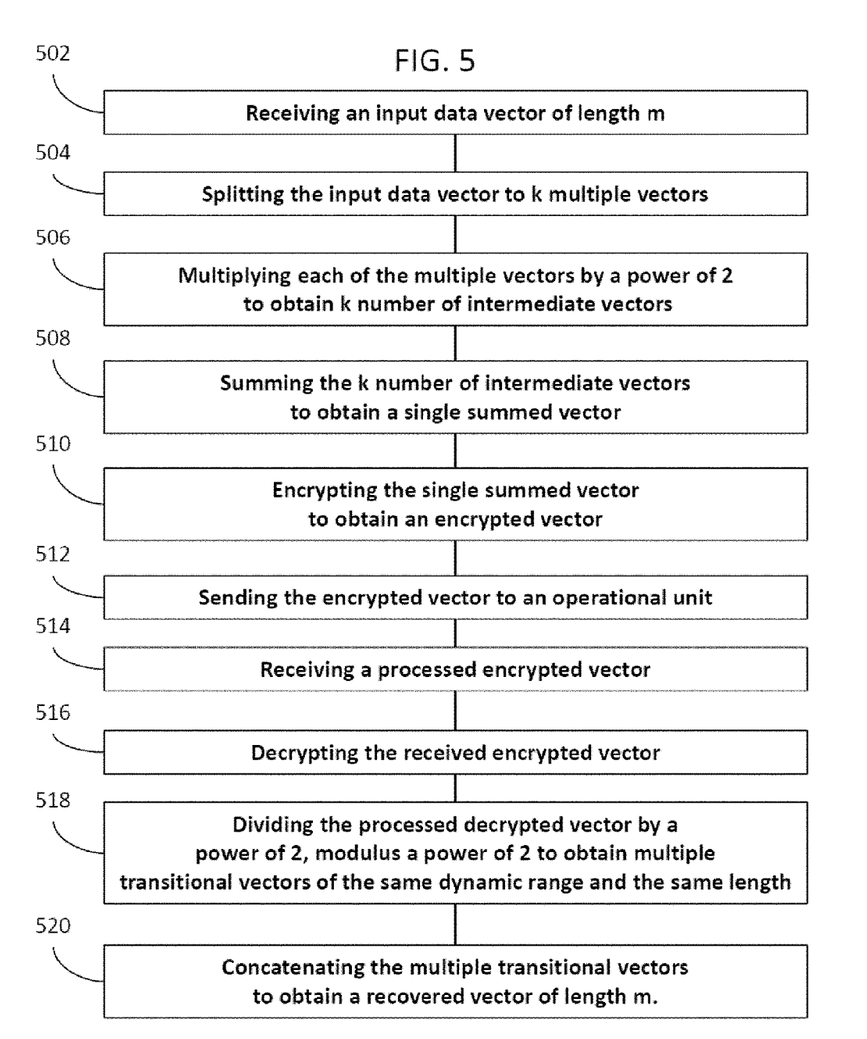
FIG. 5 is an exemplary process flow, according to some embodiments of the present invention.

FIG. 5 is an exemplary process flow, according to some embodiments of the present invention. In block 502, an input data vector of length m is received. This vector includes m samples, each being x-bit wide. The input data vector is then split to k multiple vectors, in block 504. In some embodiments, input data vector may be down-sampled for faster processing, before it is split. Each of the multiple vector has a length smaller than m. This facilitates the vector computations and mixing operations. In block 506, each of the k multiple vectors is multiplied by a power of 2 to obtain k number of intermediate vectors. Each of the intermediate vectors has the same length as a vector of the k multiple vectors with the largest length. The k number of intermediate vectors are then summed to obtain a single summed vector, in block 508. The single summed vector is then encrypted to obtain an encrypted vector, in block 510. The encrypted vector is then to an operational unit, for example a mixer, to have the encrypted vector operated on (mixed) to obtain a processed encrypted vector, in block 512.

In block 514, a processed encrypted vector is received from the operational unit and decrypted in block 516. The processed decrypted vector is then divided by a power of 2, modulus a power of 2 to obtain multiple transitional vectors of the same dynamic range and the same length, in block 518. In block 520, the multiple transitional vectors are concatenated to obtain a recovered vector of length m. The recovered vector may then be played back by a speaker.

In some embodiments, if the input data vector was down-sampled, then the recovered vector is scaled back to the original sample rate of the input vector. It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for encoding encrypted voice data for further processing, the method comprising:
    receiving an input voice data vector of length m, where m is an integer, and wherein the input voice data vector is originated from a microphone;
    down-sampling the received input voice data vector to generate down-sampled input data vector;
    splitting the down-sampled input data vector to k multiple vectors, each multiple vector having a length smaller than m, where k is an integer;
    multiplying each of the multiple vectors by a power of 2 to obtain k number of intermediate vectors, each intermediate vector having a same length equal to the length of a vector of the k multiple vectors with the largest length;
    summing the k number of intermediate vectors to obtain a single summed vector;
    encrypting the single summed vector to obtain an encrypted vector;
    transmitting the encrypted vector over the Internet to an operational unit to have the encrypted vector operated on to obtain a processed encrypted vector;
    receiving the processed encrypted vector over the Internet;
    decrypting the received encrypted vector to obtain a processed decrypted vector;
    dividing the processed decrypted vector by modulus a power of 2 to obtain multiple transitional vectors of the same dynamic range and the same length;

concatenating the multiple transitional vectors to obtain a recovered voice data vector of length m, wherein k=2, wherein the received input data vector includes m x-bit samples and each entry of the first and second vectors is y bits long, and wherein said down-sampling the received input data vector further comprises: dividing the received input data vector to m number of y-bit samples entered on 0 mod $2^y$ by shifting all samples to a 0 mean, and dividing all samples by $2^{x-y}$; and playing back the recovered voice data vector by a speaker.

2. The method of claim 1, further comprising scaling the recovered voice data vector.

3. The method of claim 2, wherein said scaling the recovered voice data vector further comprises: multiplying the recovered vector by $2^{(x-y-z)}$, where z is an integer number of shift operations performed for said multiplying each of the n entries of the first vector.

4. The method of claim 1, wherein said splitting the input data vector further comprises: splitting the input data vector to a first vector of length $n=2^{floor(log 2(m))}$ and a second vector of length (m−n).

5. The method of claim 4, wherein said multiplying each of the multiple vectors further comprises: multiplying each of the n entries of the first vector by $2^{(y+z)}$; and padding the (m−n) entries of the second vector with an additional (2n−m) zeroes, where z is an integer number of shift operations performed for said multiplying each of the n entries of the first vector.

6. The method of claim 5, wherein said dividing the processed decrypted vector further comprises: integer dividing the processed decrypted vector by $2^{(y+z)}$ to obtain a first transitional vector; and computing on the decrypted vector mod $2^{(y+z)}$ to obtain a second transitional vector of the same length.

7. A voice data terminal for encoding encrypted voice data for further processing comprising:
   a first input port for receiving an input voice data vector of length m, where m is an integer, and wherein the input voice data vector is originated from a microphone;
   a splitter circuit for splitting the input voice data vector to k multiple vectors, each multiple vector having a length smaller than m, where k=2, wherein said splitting the input data vector further comprises: splitting the input data vector to a first vector of length $n=2^{floor(log2(m))}$ and a second vector of length (m−n);
   a multiplier circuit for multiplying each of the multiple vectors by a power of 2 to obtain k number of intermediate vectors, each intermediate vector having a same length equal to the length of a vector of the k multiple vectors with the largest length;
   an adder circuit for summing the k number of intermediate vectors to obtain a single summed vector;
   an encryption circuit for encrypting the single summed vector to obtain an encrypted vector;
   a network interface circuit for sending the encrypted vector over the Internet to an operational unit to have the encrypted vector operated on to obtain a processed encrypted vector, wherein the network interface circuit receives the processed encrypted vector;
   a decryption circuit for decrypting the received encrypted vector to obtain a processed decrypted vector over the Internet;
   a divider circuit for dividing the processed decrypted vector by modulus a power of 2 to obtain multiple transitional vectors of the same dynamic range and the same length;
   an inserter circuit for concatenating the multiple transitional vectors to obtain a recovered voice data vector of length m, wherein
   said multiplying each of the multiple vectors further comprises: multiplying each of the n entries of the first vector by $2^{(v+z)}$; and padding the (m−n) entries of the second vector with an additional (2n−m) zeroes, where each entry of the input data vector is y bits long and z is an integer number of shift operations performed for said multiplying each of the n entries of the first vector; and
   a speaker for playing back the recovered voice data vector.

8. The voice data terminal of claim 7, further comprising a down-sampler circuit for down-sampling the received input voice data vector before splitting; and a scaler circuit for scaling the recovered voice data vector.

9. The method of claim 8, wherein the received input data vector includes m x-bit samples, and wherein said down-sampling the received input data vector further comprises: dividing the received input data vector to m number of y-bit samples entered on 0 mod $2^y$ by shifting all samples to a 0 mean, and dividing all samples by $2^{x-y}$.

10. The method of claim 9, wherein said scaling the recovered vector further comprises: multiplying the recovered vector by $2^{(x-y-z)}$.

11. The method of claim 7, wherein said dividing the processed decrypted vector further comprises: integer dividing the processed encrypted vector by $2^{(y+z)}$ to obtain a first transitional vector; and computing on the decrypted vector mod $2^{(y+z)}$ to obtain a second transitional vector of the same length.

* * * * *